United States Patent
Beardsley et al.

(10) Patent No.: US 6,764,185 B1
(45) Date of Patent: Jul. 20, 2004

(54) PROJECTOR AS AN INPUT AND OUTPUT DEVICE

(75) Inventors: Paul A. Beardsley, Boston, MA (US); Ramesh Raskar, Cambridge, MA (US); Clifton L. Forlines, Cambridge, MA (US); Dirk Brinkman, Cambridge, MA (US)

(73) Assignee: Mitsubishi Electric Research Laboratories, Inc.

( * ) Notice: Subject to any disclaimer, the term of this patent is extended or adjusted under 35 U.S.C. 154(b) by 0 days.

(21) Appl. No.: 10/636,356

(22) Filed: Aug. 7, 2003

(51) Int. Cl.⁷ .................. G03B 21/00; G03B 21/26; H04N 9/31
(52) U.S. Cl. .................. 353/122; 353/121; 353/42; 353/30; 348/744
(58) Field of Search .................. 353/94, 69, 70, 353/121, 122, 42, 30; 702/152; 382/154; 348/383, 744; 345/32, 582

(56) References Cited

U.S. PATENT DOCUMENTS

| | | | |
|---|---|---|---|
| 6,271,853 B1 * | 8/2001 | Oxaal .................. | 345/848 |
| 6,456,339 B1 * | 9/2002 | Surati et al. .................. | 348/745 |
| 6,628,819 B1 * | 9/2003 | Huang et al. .................. | 382/154 |
| 2002/0015052 A1 * | 2/2002 | Deering .................. | 345/647 |
| 2002/0059042 A1 * | 5/2002 | Kacyra et al. .................. | 702/152 |
| 2003/0025788 A1 * | 2/2003 | Beardsley .................. | 348/43 |

* cited by examiner

*Primary Examiner*—Russell Adams
*Assistant Examiner*—Melissa J Koval
(74) *Attorney, Agent, or Firm*—Andrew Curtin

(57) ABSTRACT

An interactive display system includes a sensor for sensing a relationship between a mobile coordinate frame fixed to a moving projector, and a stable coordinate frame fixed to a stationary display surface in the real world. An output image to be projected on the display surface is partitioned into a black image portion having a fixed relationship to the mobile coordinate frame, a stable image portion within the block image portion having a fixed relationship to the stable coordinate frame, and a mobile image portion within the stable image portion having a fixed relationship to the mobile coordinate frame. The mobile portion can be used as a pointer within the stable portion in a mouse-cursor like manner.

21 Claims, 2 Drawing Sheets

PROJECTOR AS AN INPUT AND OUTPUT DEVICE

FIELDS OF THE INVENTION

This invention relates to projectors, and more particularly to projectors used both as input and output devices.

BACKGROUND OF THE INVENTION

A projector can be used as a pointing device, a common example being a laser pointer. This allows a user to specify a point, but not to show a track, such as a circle defining a region on a surface. One way to show a track in the prior art is to augment the laser pointer with a fixed camera in the environment, observing the display surface to recover the track of the laser point, and a fixed projector to project a view of the recovered track. Thus the hand-held laser pointer must be augmented with a fixed installation in the environment, and this reduces portability.

A projector can also be used to project augmentation information onto a physical object or surface, as is known in the prior art. Most systems have used some mechanism for identifying an object or surface of interest, some mechanism for finding the relative position between the projector and the object or surface, and have then displayed augmented information. There has been little work on augmentation using hand-held projectors. But as projectors become smaller and portable, many uses of augmentation are likely to arise in opportunistic situations in everyday settings that make use of hand-held projectors, not in fixed installations. Furthermore if augmentation is to be truly flexible, there is a need to control the augmentation. For example when projecting information for a maintenance task onto a machine there may be a series of steps each requiring different projected augmentation, so there is a need for a mechanism to move through the steps, and there may be a need for flexibility in choosing between different steps.

Thus, there is a need to control and interact with projected augmentation from a hand-held projector. To obtain a familiar mode of interaction, the user could use a projector with attached touch-pad, or a thumbwheel, e.g., for 1D selections, and could display for example a menu, and then use the touch-pad to select a menu item, as a way of controlling the augmentation. But this adds expense because the projector must be augmented with a touch-pad. And it adds size. And it may be clumsy or difficult to obtain the required accuracy of positioning the cursor when working with a hand-held device with a small touch-pad.

Therefore, it is desired to provide a hand-held projector that does not have the limitations and problems of the prior art systems. It is desired to have a hand-held projector which not only projects a point, but which can also display a visible track as the user moves the projector. It is also desired to allow the user to interact with augmentation information from a hand-held projector by a mouse-style interaction, in a natural manner with one hand.

SUMMARY OF THE INVENTION

An interactive display system includes a sensor for sensing a relationship between a mobile coordinate frame fixed to a moving projector, and a stable coordinate frame fixed to a stationary display surface in the real world.

An output image to be projected on the display surface is partitioned into a black image portion having a fixed relationship to the mobile coordinate frame, a stable image portion within the black portion having a fixed relationship to the stable coordinate frame, and a mobile image portion within the stable portion having a fixed relationship to the mobile coordinate frame.

The black portion has the same outer boundary as the boundary of the fill projector display area. The stable portion appears fixed on the display surface. The mobile portion can be used as a pointer to information within the stable portion.

DETAILED DESCRIPTION OF THE PREFERRED EMBODIMENTS

Figure 1:
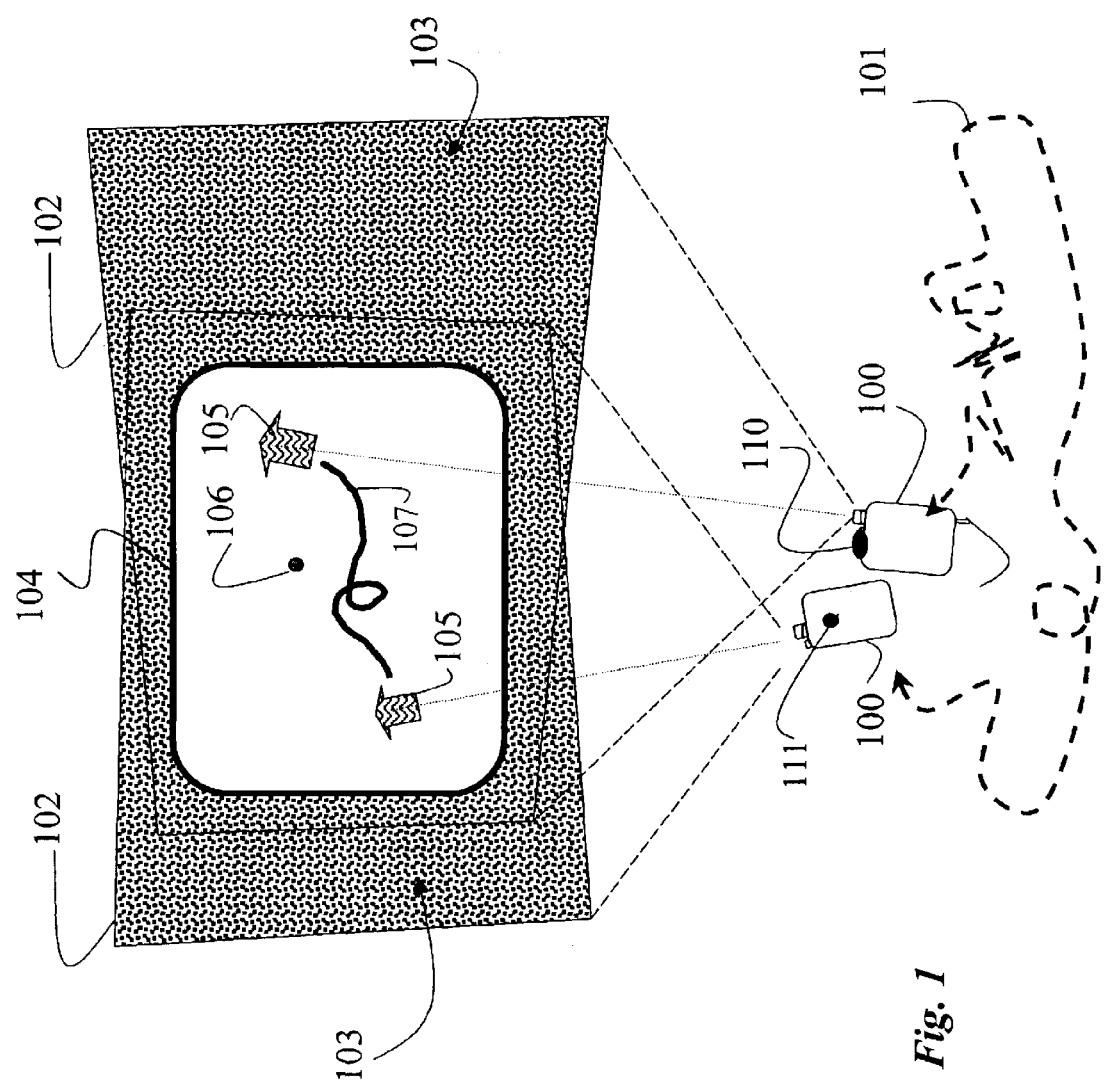
FIG. 1 is a block diagram of operations of a projector according to the invention.

A portable projector 100 according to the invention is equipped with a motion sensor 110 to determine a pose of the moving projector relative to a fixed display surface. Hereinafter, the 'pose' is the 3D position and 3D orientation. Because the projector 100 can move along a track 101, the output images 102 may appear on the display surface as irregular quadrilaterals. The motion sensor 110 can be a camera, tilt sensors, or accelerometers.

The projector 100, using the motion sensor 110, projects output images 102 in a novel way. Four types of images are defined, the output image 102, and a black image portion 103, a stable image portion 104, and a mobile image portion 105 partitioned from the output image. Pixels of the black portion are mutually exclusive from the stable portion, and pixels of the mobile portion are within the boundary of the stable portion.

The output images 102 include all pixels for all source data stored in a projector image or frame buffer. The pixel of the output image move on the display surface according to a coordinate frame that is in a fixed relationship to the projector, this is conventional.

Some of the output pixels can be set to "black," i.e., a zero pixel intensity value to make the black image portion 103, which is shown stippled in FIG. 1, "invisible". These pixels also move according to the coordinate frame of the projector.

The pixels of the stable image portion 104 are fixed to a coordinate frame of the real-world. The location of these pixels 104 within the output image 102 is determined using the motion sensor 110. Thus, as the projector is moved 101 to different poses, the stable image 104 appears at a fixed location on the display surface.

The motion stabilization is performed, for example, by moving the pixels of the stable portion down within the output image 102 when the projector is pointed up.

The specific requirements to perform motion stabilization are a relative pose of the projector to the display surface as provided by the motion-sensor, and a 3D description of the display surface which may be planar, quadric, or a physical object of arbitrary shape. In the special case that the user is only orienting the projector, i.e., rotating, but changing its location, i.e., translating, the requirements to perform motion stabilization are the rotational motion, but there is no need for a 3D description of the display surface.

A size and shape of the stable image portion can be initialized in a predetermined way e.g., an inner rectangle of half the dimensions of the output image, initially centered at the center of the output image. Motion stabilization is possible as long as the stabilized window continues to lie somewhere within the fill output image as the projector is moved.

The pixels of the mobile image portion 105 move according to the mobile coordinate frame of the projector. For example, these pixels 105 can appear as a pointer, cursor, or some other icon. So that as the projector is moved left to right, it appears that the pointer moves in the same manner, within the stable image portion. Up and down motion of the projector is mimicked in a like manner, so that the projector effectively behaves as a laser type or mouse type pointer.

In a preferred embodiment, the movement of the mobile portion is confined to be within the stable portion, as it would be if the stable image portion were a conventional display screen and the mobile image portion were a conventional cursor.

In an alternative embodiment, the projector and the motion-sensor are separate. For example, the projector is fixed in the environment, and the motion-sensor is a hand-held device that the user directs at a display surface. The operation is as described above, with a stable image being shown on the display surface, and the motion of the hand-held determining the motion of a mobile portion such as a cursor, within the stable image, In another alternative embodiment, the motion-sensor may not be a self-contained device. The motion sensor can be, for example, a fixed camera in the environment that is observing the user's hand motion and using it to determine the location of the hand and the desired pointing direction relative to the display surface.

Projector Structure

Figure 2:
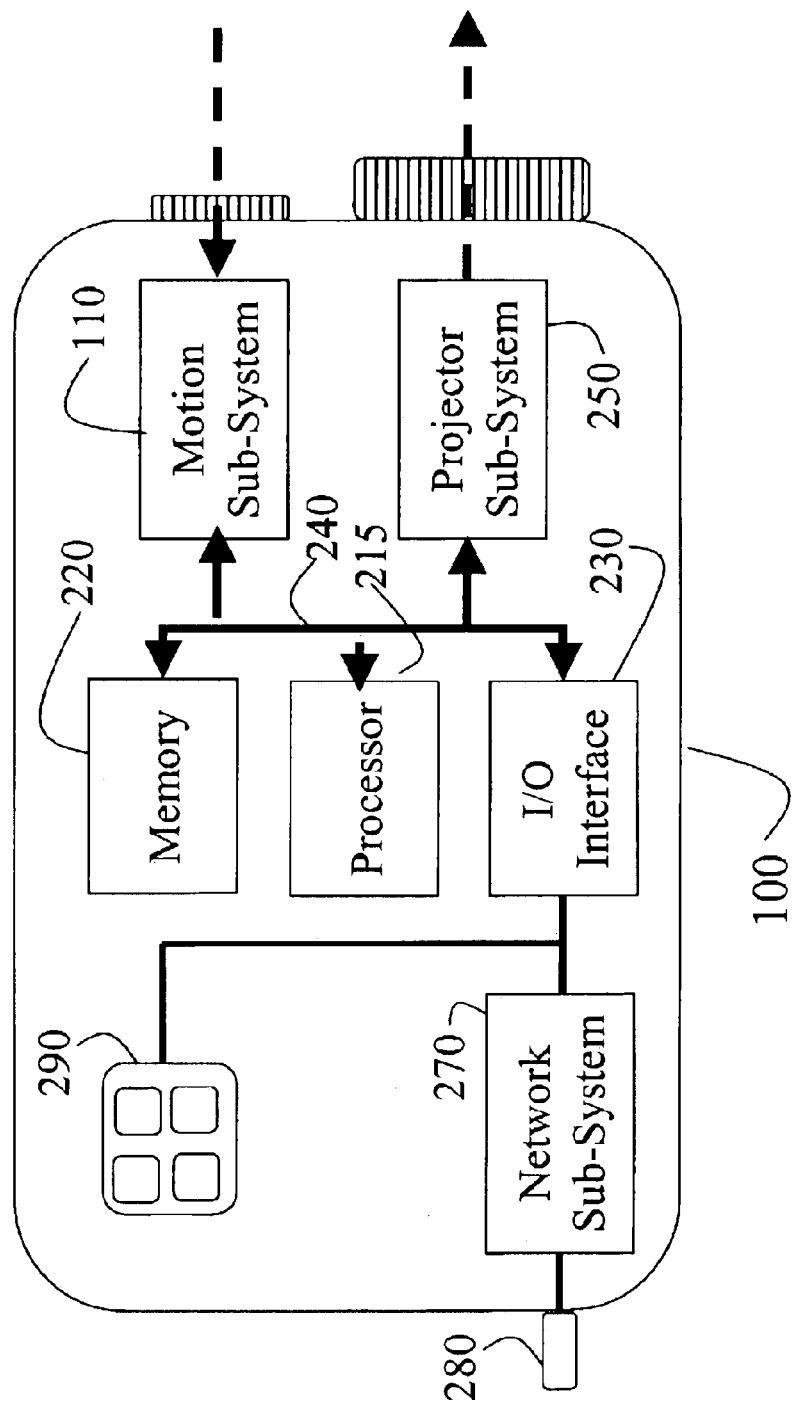
FIG. 2 is a block diagram of a projector according to the invention.

FIG. 2 shows the projector 100 equipped with a motion sensor subsystem 110, and other components, including a microprocessor 215, a memory 220, and an I/O interface 230 connected by buses 240, generally a processing unit. The processing unit is conventional in its electronic structure, but unconventional in its operation when performing the method steps described herein. The projector also includes a projector sub-system 250 for displaying the output images 102. A network sub-system 270 allows the projector to communicate with other similar devices, or other computing devices and memories, local or remote. Therefore, the network system can be connected to an antenna or infrared transceiver 280, depending on the communications medium. A user interface 290 can provide input and output data to facilitate operation of the projector. The user interface can include some buttons. The motion sensor determines the pose of the projector, and can be a camera. For further detail, see U.S. patent application Ser. No. 10/394,314, "Geometrically Aware Projector" filed Mar. 19, 2003, by Beardsley, Raskar and Van Baar, incorporated herein by reference.

Calibration

The projector is pre-calibrated so that the intrinsic parameters of the projector 100 are known, as well as the translation and rotation between the projector coordinate frame and the motion-sensor coordinate frame. In the case that the motion-sensor is a camera, the intrinsic parameters of the camera are also calibrated. See U.S. Pat. No. 6,527,395 issued to Beardsley and Raskar on Mar. 4, 2003, "Method for Calibrating a Projector with a Camera" incorporated herein by reference.

Recovery of the projector position relative to a display surface of known 3D coordinates is by means of the motion sensor. If the motion-sensor is a calibrated camera, the requirement for determining pose of the camera relative to the display surface is that there are three distinct identifiable points at known 3D positions on the surface. The camera pose is used to infer the projector pose relative to the display surface, by using the calibrated translation and rotation of the projector relative to the camera.

Given the projector pose relative to the known 3D surface, and the projector intrinsic parameters, this comprises all the information needed to determine the correspondence between each projector pixel and the 3D point to which it projects on the display surface. Thus, one can display a motion-stabilized image on the display surface as the projector moves, because for a required 3D point on the surface, the projector pixel that illuminates that point at the current time instant is always known.

In the case of projecting onto a complex 3D object, one can also determine when there is occlusion of some parts of the surface by others, so this can be taken into account.

Example Applications—Pointing and Outlining

In a simple application, the pixels of the stable image portion 104 are also set to black, and the mobile image portion is a dot of red pixels 106. In effect, all that appears to the viewer is the red dot. In this case, the projector is indistinguishable from a laser pointer, and can be used for all like functions.

The projector according to the invention can also show a visual track 107 of the pointer moving across the display surface. For example, the mobile data can be a cursor. As the user moves the projector, the cursor appears to move on the display surface. The pointer motion is recorded over time, and the stable portion is used to show the track 107.

The result from the user's perspective is a moving cursor that naturally follows any motion of the hand-held projector, plus a stable view of the track 107 traced as the cursor moves across the display surface.

In another application of displaying a track, the projector can be used to "write" on the display surface, creating characters, words or shapes.

Example Applications—Mouse Interaction

The invention can also be used for "mouse-style" interaction with projected data on the display surface.

In this case, the mobile portion is a cursor that is, perhaps, fixed at a center of the projector's output image. The stable image portion includes several components, for example, menu items. The result from the user's perspective is a moving cursor that naturally follows any motion of the hand-held projector, which is tracked across a static menu until it is above a desired menu item. At this point, one of the buttons 111 can then be clicked to select the item, in a mouse-like manner by sensing the instantaneous location of the pointer within the stable image.

Selecting a menu item is an illustrative example of the invention, but it is clear that any of the mouse interactions which occur in a conventional windows-style computing environment—using the mouse to move windows, opening and closing icons, clicking on confirmation boxes, drag-and-drop, shape resizing—can be done with an ordinary projector using the invention. As with a conventional mouse, left/middle/right "click" buttons can be provided.

The stable image can also include images of real-world scenes acquired in a conventional manner, and the point and track operations can be used to initiate photo editing operations on the images of the scenes.

Example Applications—Capturing an Image of a Specified Region

The invention has increased functionality when the motion-sensor is a camera. Apart from sensing position relative to the display surface, the camera also acquires an input image of the display surface. The user can employ the 'pointer' to draw a boundary to indicate a region area of interest on the display surface.

The system can extract the region of interest from the input image, and store the region in the memory. The projector can later project this stored region on a new display surface. Thus the cut-and-paste operation, familiar from everyday computer interaction, has an analog in which real textures in the physical world are cut, by indicating the required area and storing its image, and pasted, by projecting the stored data onto a new display surface.

An example is the cut-and-paste operation for a mural on a wall. The user outlines the approximate boundary of the mural using the cursor, and is presented with a visual indication of the selected boundary. Some mechanism, perhaps the completion of the boundary, or a button, is used to initiate the 'cut' on the part of the image within the boundary. As an extra step, the rough outline can be refined using computer vision processing on the image around the specified boundary, to more closely 'lock' onto the actual boundary of the mural in the image, or one of a set of standard shapes, e.g., circle, square, etc. The image area for the mural is stored. Subsequently this image area can be pasted onto some other display surface, or incorporated into stored images and documents.

Example Applications—Processing Physical Markers

Assuming again that the projector has an attached camera, the invention can be used to identify a point or area on a display surface, to direct special vision processing at the image for that part of the surface.

As an example, a common way to do object identification prior to projecting augmentation onto an object is to label the object with barcodes or color-coded makers, see U.S. patent application Ser. No. 10/346,442 "Position and Orientation Sensing with a Projector" field on Jan. 17, 2003, by Beardsley et al., incorporated herein by reference.

Detecting these markers initiates the required projection. But a camera that is capturing an image of a cluttered scene The invention enables the user to point or encircle physical markers in the scene, thereby directing the marker detection to a specific part of the image, so that the vision processing is not degraded by surrounding clutter.

In another example, the user can indicate simpler types of visual markers in the scene, e.g., an 'X' mark to discontinue processing. In contrast, prior systems, cannot use simple icons because the processing is undirected, and many false positives are likely to arise when processing the whole of a cluttered image.

The user can place multiple distinct physical markers in a scene, each with a different meaning such as "start projecting augmentation" or "stop projecting augmentation" such that they are simultaneously visible. Then, the invention can be used to indicate the location of the required marker, the vision processing identifies the marker by processing just that area of interest, and the required action is carried out. Thus, in contrast to prior systems, the camera can simultaneously view multiple markers with different meanings, without any conflict because the user initiates the identification of specific markers.

Defining and Moving the Stable Projection

As described above, the stable image portion of the projection can be initialized as a predefined area in the center of the output image. In another application, the user starts by displaying a cursor only, and the cursor is used to define a location on the display surface at which the stable portion is to appear.

Also as described above, the stable portion is fixed relative to the display surface. But the user may sometimes wish to displace the stable portion to a new location. To achieve this, the cursor can be "bumped" against the border of the stable portion to "drag" the stable portion in a like direction. Bumping means being immediately adjacent.

Thus the user can cause the stable portion to translate on the display surface. This mode of operation should be distinguished from the "click and drag" mode on a conventional computer where windows are moved within the stable "desk-top" seen on the screen. Instead, the analogy is that the invention would drag the entire desk-top to a different location. This would like picking up the CRT, and putting it on another desk.

Thus, when the cursor is on the edge of the stable area, the mobile portion, as well as all other pixels, move according to the coordinate frame of the projector. The stable portion 104 can be recentered within the output image 102 to maximize the effective range of the mobile portion after the cursor leaves the edge, and re-enters the interior portion of the stable image portion.

Alternatively, if the projector has moved such that the boundary of the output image is in contact with—meaning immediately adjacent to—the boundary of the stable portion, then the stable portion is moved on the display surface such that it continues to lie within the output image. From the user's perspective, the effect is the same as above, where the entire viewing port is relocated. Thus, the 'desk-top' can be relocated either when the boundary of the output image becomes adjacent to the stable image portion from the outside, or the mobile portion become adjacent to the stable portion from the inside, which ever occurs first.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. An interactive display system, comprising:
 a sensor configured to sense a relationship between a mobile coordinate frame and a stable coordinate frame; and
 means for partitioning a projected output image into a black image portion having a fixed relationship to the mobile coordinate frame, a stable image portion within the black image portion having a fixed relationship to the stable coordinate frame, and a mobile image portion within the stable image portion having a fixed relationship to the mobile coordinate frame.

2. The system of claim 1, further comprising:
 a projector fixed relative to the mobile coordinate system; and
 a display surface in the real world fixed relative to the stable coordinate frame.

3. The system of claim 1, in which the stable image portion moves as the mobile image portion, when the stable image portion is immediately adjacent to the mobile image portion.

4. The system of claim 1, in which the stable image portion moves as the black image portion, when the stable image portion is immediately adjacent to an outer boundary of the black image portion.

5. The system of claim 2, further comprising;
 means for calibrating the projector.

6. The system of claim 2, in which the projector is moving while projecting the output image on the display surface.

7. The system of claim 6, in which the mobile image portion is a pointer.

8. The system of claim 7, in which the stable image portion includes a plurality of components, and further comprising;
 means for initiating a computer operation according to a current location of the mobile image portion relative to one of the components of the stable image portion.

9. The system of claim 7, further comprising:
means for projecting a track of the pointer as the pointer is moving in the stable image portion.

10. The system of claim 9, in which the track is conformed to a predetermined shape.

11. The system of claim 9, in which the stable image portion includes a plurality of components, and further comprising;
means for initiating a computer operation according to a current location and shape of the track relative to one of the components of the stable image portion.

12. The system of claim 1, in which the sensor is a camera.

13. The system of claim 12, in which the mobile image portion is a pointer, and further comprising:
means for projecting a track of the pointer as the pointer is moving in the stable image portion, the track defining a region on a display surface; and
means for extracting the region from an input image acquired by the camera.

14. The system of claim 13, further comprising:
means for projecting the extracted region onto an arbitrary display surface.

15. The system of claim 11, further comprising:
means for initiating a computer processing on the extracted region.

16. The system of claim 15, in which the extracted region is a physical marker of distinct appearance on the display surface, and the computer processing identifies the physical marker, and the identity of the marker is used to initiate a computer operation.

17. The system of claim 1, in which the sensor is moved by a hand, and further comprising:
a projector and a display surface fixed relative to the stable coordinate frame.

18. The system of claim 1, in which the sensor is a camera acquiring images of a moving object to determine the mobile coordinate frame, and further comprising:
a projector and a display surface fixed relative to the stable coordinate frame.

19. The system of claim 7, in which the pointer is used to define a shape of the stable image portion.

20. The system of claim 11, in which the computer operation is applied to the stable image according to the current location and shape of the track, and the stable image includes an image acquired of a real-world scene.

21. An interactive display method, comprising:
sensing a relationship between a mobile coordinate frame and a stable coordinate frame; and
partitioning a projected output image into a black image portion having a fixed relationship to the mobile coordinate frame, a stable image portion within the block image portion having a fixed relationship to the stable coordinate frame, and a mobile image portion within the stable image portion having a fixed relationship to the mobile coordinate frame.

* * * * *